(12) United States Patent  (10) Patent No.: US 8,594,111 B2
Lam et al.  (45) Date of Patent: Nov. 26, 2013

(54) METHOD AND DEVICE FOR BUFFERING CELL BY CROSSBAR SWITCHING MATRIX

(75) Inventors: Wan Lam, Shanghai (CN); Xinwei Han, Chengdu (CN); Zhengrong Liu, Chengdu (CN); Xu Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 13/422,698

(22) Filed: Mar. 16, 2012

(65) Prior Publication Data
US 2012/0236850 A1 Sep. 20, 2012

(30) Foreign Application Priority Data
Mar. 16, 2011 (CN) .......................... 2011 1 0063513

(51) Int. Cl.
*H04L 12/28* (2006.01)
*H04L 12/54* (2013.01)
*H04L 12/50* (2006.01)

(52) U.S. Cl.
USPC .......................................... 370/412; 370/360

(58) Field of Classification Search
None
See application file for complete search history.

(56) References Cited

U.S. PATENT DOCUMENTS

| | | | |
|---|---|---|---|
| 5,892,766 A * | 4/1999 | Wicki et al. | 370/412 |
| 6,032,205 A * | 2/2000 | Ogimoto et al. | 710/33 |
| 6,970,454 B1 * | 11/2005 | Purcell et al. | 370/355 |
| 7,016,365 B1 * | 3/2006 | Grow et al. | 370/413 |
| 7,822,012 B1 * | 10/2010 | Purcell et al. | 370/351 |
| 2002/0012356 A1 * | 1/2002 | Li et al. | 370/423 |
| 2006/0256783 A1 * | 11/2006 | Ayrapetian et al. | 370/360 |
| 2007/0280261 A1 | 12/2007 | Szymanski | |

FOREIGN PATENT DOCUMENTS

| | | |
|---|---|---|
| CN | 101110661 A | 1/2008 |
| CN | 100421420 C | 9/2008 |
| KR | 20040048760 A | 6/2004 |
| WO | 2010/045732 A1 | 4/2010 |

OTHER PUBLICATIONS

1st Office Action in corresponding Chinese Patent Application No. 201110063513.3 (Apr. 22, 2013).

* cited by examiner

*Primary Examiner* — Clemence Han
(74) *Attorney, Agent, or Firm* — Leydig, Voit & Mayer, Ltd.

(57) ABSTRACT

The present invention discloses a method for buffering a cell by a crossbar switching matrix, which includes: sending a jitter timestamp to a switching port connected to the crossbar switching matrix through a link, and receiving a cell that is sent by the switching port and carries the jitter timestamp, in which the jitter timestamp indicates a jitter of the link itself; and using a sum of the jitter timestamp carried in the cell and a relative delay timestamp of the corresponding link as a total timestamp, and storing the cell in a buffering unit corresponding to the total timestamp in a cell buffer of the link, in which the relative delay timestamp indicates a difference of a delay of the link relative to a delay of a lowest link.

8 Claims, 3 Drawing Sheets

US 8,594,111 B2

METHOD AND DEVICE FOR BUFFERING CELL BY CROSSBAR SWITCHING MATRIX

CROSS-REFERENCE TO RELATED APPLICATIONS

This application claims priority to Chinese Patent Application No. 201110063513.3, filed on Mar. 16, 2011, which is hereby incorporated by reference in its entirety.

FIELD OF THE INVENTION

The present invention relates to the field of communications technologies, and in particular, to a method and a device for buffering a cell by a crossbar switching matrix.

BACKGROUND OF THE INVENTION

A crossbar switching matrix (CrossBar, Xbar) is a space division switch capable of connecting N input ports and N output ports to each other randomly, is also referred to as a cross switch matrix, and is used in a switching network.

As shown in FIG. 1, an Xbar includes a switching circuit and a switching matrix controller. The switching circuit is formed by vertically and horizontally cross-connected 2N links that connect N input ports (Input) and N output ports (Output). A control switch is provided at each crosspoint (Crosspoint) and is configured to control the connection between the Input and the Output. The switching matrix controller decides the connection relationship between the input port and the output port in each scheduling period according to the state of an input queue. An arbitration mechanism arbitrates access of the input port to the output port, and the switching matrix controller enables or disables the relevant crosspoint according to an arbitration result, so as to realize data switching.

As shown in FIG. 2, a switching system includes a switching network (Switching, SW) and a switching port, the switching network includes a crossbar switching matrix, and the switching port is specifically a switching network interface chip (Fabric Access Processor, FAP). A switching matrix controller of the crossbar switching matrix generates arbitration result (grant) information according to the state of an input queue, and sends the grant information to the switching port. The switching port sends, according to the grant information, a cell (cell) to the switching network for switching.

Due to a delay on a link, a long time may elapse after the SW sends the grant and before the SW receives the cell. Moreover, because different links have different delays, cells corresponding to grants sent by the SW at the same time arrive at different time. The period of time from sending the grant to finally completing switching of the cell by the SW is called Grant to Switch (G2S). The G2S time depends on the maximum link delay. In addition, due to a jitter on the link, the delay of the cell even on the same link varies. To ensure simultaneous switching, the link delay and the jitter delay need to be additionally processed before the switching.

In the prior art, a cell buffer is used to compensate for the link delay and jitter delay: after a cell on a fast link arrives, the cell waits in the buffer until a cell on the slowest link arrives, and then the cells are switched together. The specific solution is as follows: The SW sends a timestamp syncts to the FAP module while sending a grant. The timestamp syncts indicates a switching time of a corresponding cell. The FAP module sends the syncts as a field in a cell header together with the cell. A buffer is set in the SW for each input port, the buffer includes multiple units, and each unit corresponds to a value of syncts. After receiving the cell, the SW stores the cell in the corresponding buffering unit according to the syncts in the cell header. When the switching time indicated by the syncts arrives, the switching matrix controller loads switched configuration (namely, an arbitration result) corresponding to the syncts into the switching circuit, and meanwhile each input port reads the cell corresponding to the syncts from the buffer, so that the switched configuration is consistent with the switched cell, and finally, cell switching is completed. Detailed description is provided below with reference to an accompanying drawing.

In an Xbar shown FIG. 3, a buffer cbuf is used before a switching circuit to store a cell to be switched to absorb the jitter delay and link delay on a link. The buffer cbuf has a total of N×M units, respectively corresponding to N input links and M switching time, where M cannot be smaller than the value of G2S. Meanwhile, the value range of a syncts field carried in a cell header also cannot be smaller than the value of G2S, so as to realize mapping between syncts values and buffering units. The Xbar further includes a buffer ctbl which needs to buffer M arbitration results (namely, switched configuration). At each time of switching, an SW sends switched configuration corresponding to current syncts from the buffer ctbl to the switching circuit, and meanwhile sends all input cells corresponding to the current syncts from the buffer cbuf to the switching circuit. At the switching time, because grant information of this group of cells is sent before the G2S time, and the maximum link delay does not exceed G2S, the cells in all links corresponding to the syncts have been received in the buffer at the switching time, so that the link jitter is absorbed and the delay is corrected.

During the research and practice of the prior art, the inventors of the present invention find that, the syncts field in the cell header occupies some bits, which reduces the payload of the cell; in addition, the number of buffering units required by each input port of the SW cannot be smaller than the maximum syncts value, while the syncts value depends on the value of G2S and cannot be smaller than the value of G2S. The prior art lacks a technical solution by using which the payload of the cell is increased and the size of the cell buffer is reduced.

SUMMARY OF THE INVENTION

Embodiments of the present invention provide a method and a device for buffering a cell by a crossbar switching matrix, which can increase the payload of the cell and reduce the size of a cell buffer.

A method for buffering a cell by a crossbar switching matrix includes:

receiving a cell to be switched, and obtaining a jitter delay value of the cell according to a timestamp carried in the cell to be switched, in which the timestamp is used for indicating a jitter delay of the cell to be switched in link transmission;

obtaining, according to a preset mapping between a link delay value and a link, a link delay value corresponding to a link transmitting the cell to be switched;

obtaining a buffer address of a buffered cell in a first out-buffer sequence in a buffering unit;

obtaining an out-buffer time difference between the cell to be switched and the buffered cell in the first out-buffer sequence according to the jitter delay value and the link delay value; and obtaining a buffer address of the cell to be switched in the buffering unit according to the out-buffer time difference and the buffer address of the buffered cell in the first out-buffer sequence.

A device for buffering a cell by a crossbar switching matrix includes:

a receiving unit, configured to receive a cell to be switched;

a buffering unit, configured to buffer the cell to be switched;

a delay obtaining unit, configured to obtain a jitter delay value of the cell according to a timestamp carried in the cell to be switched, in which the timestamp is used for indicating a jitter delay of the cell to be switched in link transmission, obtain, according to a preset mapping between a link delay values and link, a link delay value corresponding to a link transmitting the cell to be switched, and obtain an out-buffer time difference between the cell to be switched and a buffered cell in a first out-buffer sequence according to the jitter delay value and the link delay value; and an address obtaining unit, configured to obtain a buffer address of the buffered cell in the first out-buffer sequence in the buffering unit, and obtain a buffer address of the cell to be switched in the buffering unit according to the out-buffer time difference and the buffer address of the buffered cell in the first out-buffer sequence.

In the embodiments of the present invention, a jitter delay value is obtained from a received cell to be switched, a link delay value is obtained according to a preset mapping, and then a buffer address of a buffered cell in a first out-buffer sequence is obtained, so as to calculate a buffer address of the received cell to be switched. In the solution, a timestamp in the cell carries only the jitter delay value, and the jitter delay value is far smaller than the value of G2S, so bits occupied by the timestamp in the cell can be reduced, thereby increasing the payload of the cell. In addition, in the solution, the size of the cell buffer is related to only the link delay value and the jitter delay value, and is unrelated to the value of G2S, and the sum of the link delay value and the jitter delay value is smaller than the value of G2S, so the size of the cell buffer can be reduced as compared with the prior art.

DETAILED DESCRIPTION OF THE EMBODIMENTS

An embodiment of the present invention provides a method for buffering a cell by a crossbar switching matrix, in which a jitter delay value is obtained from a received cell to be switched, a link delay value is obtained according to a preset mapping, and then a buffer address of a buffered cell in a first out-buffer sequence is obtained, so as to obtain an out-buffer time difference between the cell to be switched and the buffered cell in the first out-buffer sequence, thereby calculating a buffer address of the received cell to be switched. In the solution, a timestamp in the cell carries only the jitter delay value, and the jitter delay value is far smaller than the value of G2S, so bits occupied by the timestamp in the cell may be reduced, thereby increasing the payload of the cell. Moreover, the size of the cell buffer is related to only the link delay value and the jitter delay value, and is unrelated to the value of G2S, and the sum of the link delay value and the jitter delay value is smaller than the value of G2S, so the size of the cell buffer can be reduced as compared with the prior art. An embodiment of the present invention further provides a corresponding device. Detailed descriptions are provided below.

Figure 1:
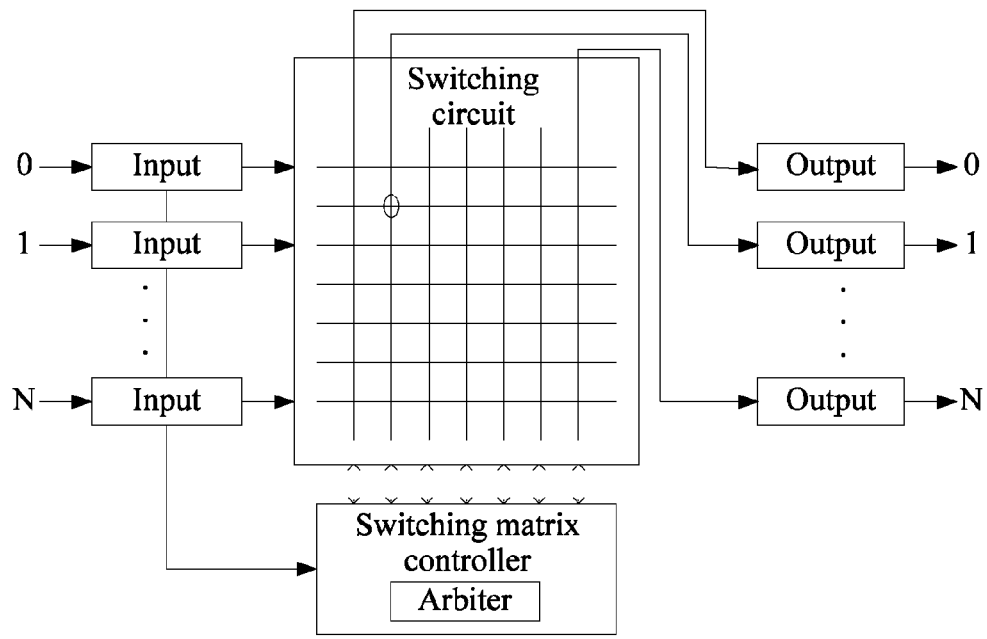
FIG. 1 is a schematic diagram of an existing crossbar switching matrix.
Figure 2:
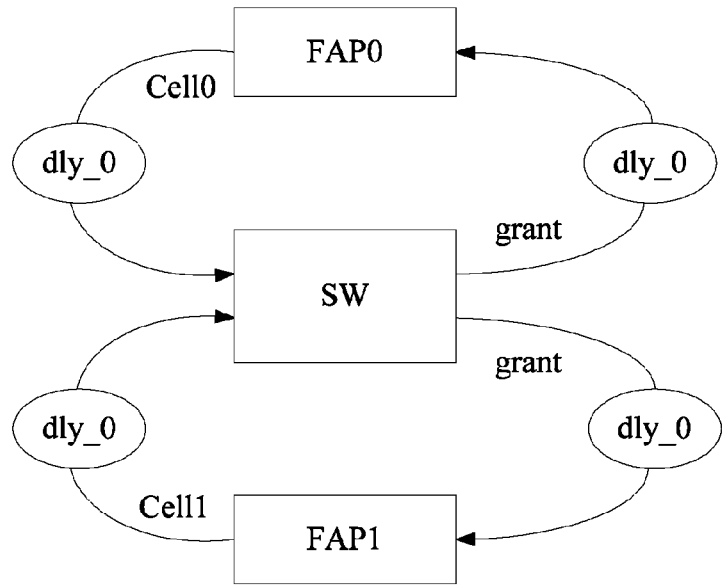
FIG. 2 is a schematic diagram of an existing switching system.
Figure 3:
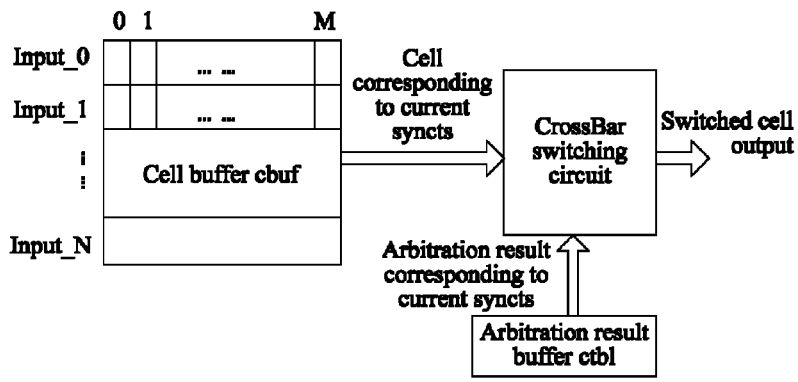
FIG. 3 is a schematic diagram of a cell buffer of an existing crossbar switching matrix.
Figure 4:
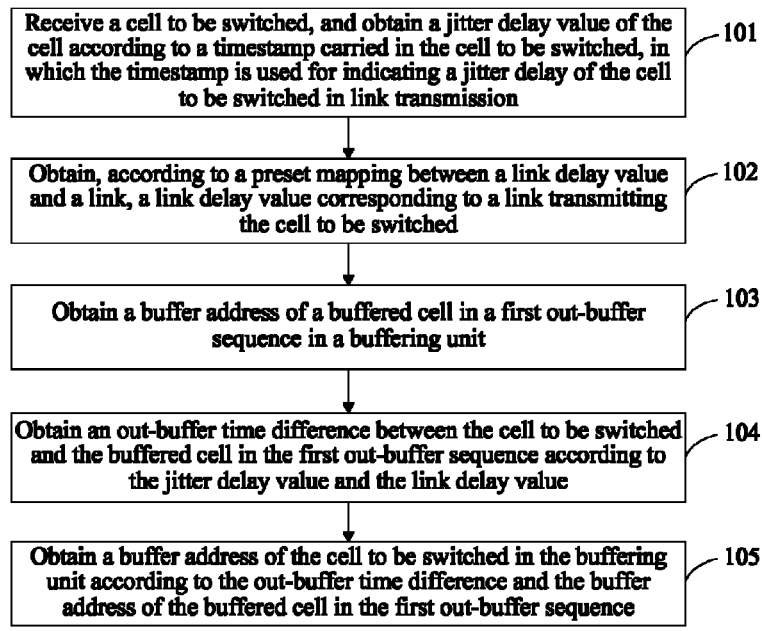
FIG. 4 is a flow chart of a method for buffering a cell by a crossbar switching matrix provided in an embodiment of the present invention.

Referring to FIG. 4, an embodiment of the present invention provides a method for buffering a cell by a crossbar switching matrix, which includes the following steps:

101: Receive a cell to be switched, and obtain a jitter delay value of the cell according to a timestamp carried in the cell to be switched, in which the timestamp is used for indicating a jitter delay of the cell to be switched in link transmission.

One of the objectives of the present invention is to reduce bits occupied by a syncts field in a cell header, so as to increase the payload of a cell. In the prior art, a syncts value depends on the value of G2S, and the value of G2S mainly depends on a link delay value and a jitter delay value of a link, and the value of G2S is generally far greater than the sum of the link delay value and the jitter delay value of the link. The inventors of the present invention find that, the link delay value of each link is relatively fixed, so the link delay value may be configured in an Xbar and does not need to be carried in a cell. Therefore, the cell to be switched needs to carry only the jitter delay of the link. In this embodiment, the crossbar switching matrix sends a jitter delay value of each link to a switching port in advance, so that a timestamp (syncts) carried in a cell sent by the switching port to an input port of the crossbar switching matrix may be used for indicating the jitter delay value only. Because the jitter delay value is far smaller than the value of G2S, the cell header needs to reserve only few bits which are sufficient to carry the timestamp syncts, thereby increasing the payload of the cell effectively. Herein, it is assumed that a maximum jitter delay value, namely, the greatest jitter delay value that a link with the largest jitter delay may have, is X. Accordingly, X units may be set in a buffering unit of each link, and each unit is configured to store one cell to absorb the jitter delay.

102: Obtain, according to a preset mapping between a link delay value and link, a link delay value corresponding to a link transmitting the cell to be switched.

As described above, the link delay value of each link is relatively fixed, so a mapping between link delay values and links may be preset, and the link delay value corresponding to the link transmitting the cell to be switched is obtained according to the mapping. The inventors find that, according to the principle of using a cell buffer to compensate for the link delay and jitter delay, after a cell on a fast link arrives, the cell waits in the buffer, and upon arrival of a cell on the slowest link, switching is performed immediately without continuing to wait until the time indicated by G2S expires. As a result, a link delay difference can be used for deciding the size of the buffer and calculating the address of the cell to be switched. The link delay difference indicates a difference between a link delay value of a link and a link delay value of a designated link, in which a link with the maximum link delay value may be used as the designated link. Therefore, the link delay difference of the link with the maximum link delay value is zero, and link delay differences of other links are constants greater than zero. Herein, it is assumed that a maximum link delay difference, namely, the difference between a link delay value of the fastest link relative and a link delay value of the lowest link, is Y. Accordingly, Y+1 units may be set in a buffering unit of each link, and each unit is configured to store one cell to absorb the link delay.

103: Obtain a buffer address of a buffered cell in a first out-buffer sequence in a buffering unit.

In this step, a buffer address of a buffered cell in a first out-buffer sequence in a buffering unit is obtained to serve as one basis for calculating a buffer address of the received cell to be switched. The buffered cell in the first out-buffer sequence means a cell currently going to be switched. It should be noted that, the buffering unit may include multiple units, each unit may buffer one cell and corresponds to one switching time, and at each switching time, a batch of cells are stored and a batch of cells are taken out for switching.

In this embodiment, the buffering unit requires X+Y+1 units to absorb the link delay and jitter delay and requires 1 unit to store the buffered cell in the first out-buffer sequence, therefore, the buffering unit may include X+Y+2 units, where X is a maximum jitter delay value of all links and Y is a maximum link delay difference of all the links.

104: Obtain an out-buffer time difference between the cell to be switched and the buffered cell in the first out-buffer sequence according to the jitter delay value and the link delay value.

A sum of the jitter delay value and the link delay value of the received cell to be switched indicates that, after the corresponding time, the cell to be switched will be taken out of the buffer for switching, that is, can be used for indicating an out-buffer time difference between the cell to be switched and the buffered cell currently in the first out-buffer sequence. Specifically, a value obtained by adding 1 to a sum of a jitter delay value and the link delay difference of the link transmitting the cell to be switched may be used as the out-buffer time difference. Assuming that the out-buffer time difference is I, I=iDly+syncts+1, where iDly indicates a difference between the link delay value of the link transmitting the cell to be switched relative to a link delay value of the lowest link, syncts indicates the jitter delay value of the link transmitting the cell to be switched, and iDly and syncts are both positive numbers.

105: Obtain a buffer address of the cell to be switched in the buffering unit according to the out-buffer time difference and the buffer address of the buffered cell in the first out-buffer sequence.

A unit corresponding to the cell to be switched in the buffering unit is obtained by moving the unit where the first buffered cell in the out-buffer sequence in the buffering unit resides backward by the number of units indicated by the out-buffer time difference. Specifically, assuming that the buffered cell in the first out-buffer sequence is stored in a $J^{th}$ unit of the buffering unit, where J is not greater than X+Y+2, when I+J is not greater than X+Y+2, a buffer address of the $(I+J)^{th}$ unit in the buffering unit is used as the buffer address of the cell to be switched, and when I+J is greater than X+Y+2, a buffer address of a $K^{th}$ unit in the buffering unit is used as the buffer address of the cell to be switched, where K is a remainder of (I+J) divided by (X+Y+2).

In the method provided in this embodiment, the crossbar switching matrix performs switching immediately after the slowest link receives a cell. In this way, each link does not need to buffer cells in the entire G2S time, and but needs to buffer only cells in a period of time of the G2S time, where the period of time depends on the link delay difference. The size of the buffering unit depends on the maximum link delay difference and the maximum link jitter delay.

With the method in the embodiment of the present invention, a timestamp in a cell carries only a jitter delay value, and the jitter delay value is far smaller than the value of G2S, so bits occupied by the timestamp in the cell can be reduced, thereby increasing the payload of the cell. Moreover, the size of the cell buffer is related to only the link delay value and the jitter delay value, and is unrelated to the value of G2S, and the sum of the link delay value and the jitter delay value is smaller than the value of G2S, so the size of the cell buffer can be reduced as compared with the prior art.

Figure 5:
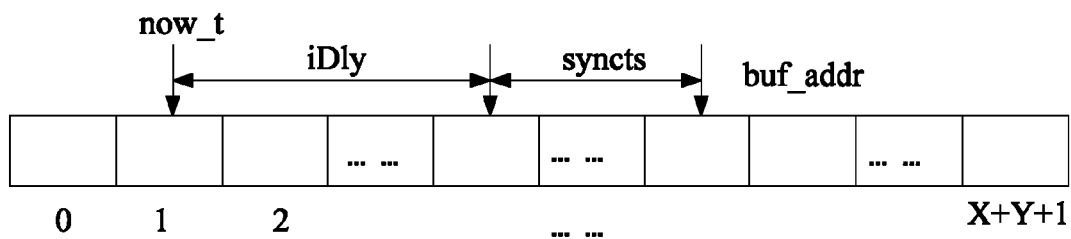
FIG. 5 is a schematic diagram of a cell buffer of a link in an embodiment of the present invention.

Referring to FIG. 5, how a buffer address of a cell to be switched is calculated is further illustrated below.

It is assumed that now_t indicates the address of a buffering unit corresponding to a buffered cell in a first out-buffer sequence at a time when a cell to be switched is received. Then, the address buf_addr of a buffering unit corresponding to the received cell to be switched is calculated as follows: buf_addr=now_t+iDly+syncts+1.

When buf_addr≤X+Y+2, the cell is buffered in the buffering unit corresponding to buf_addr; when buf_addr>X+Y+2, the cell is buffered in a buffering unit corresponding to a remainder of buf_addr divided by X+Y+2. The description is provided below with specific examples.

Figure 6:
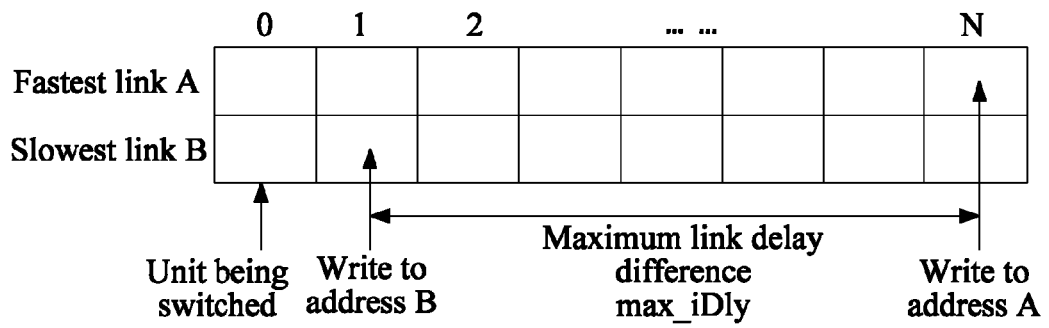
FIG. 6 is a schematic diagram illustrating an operating principle of a crossbar switching matrix in an embodiment of the present invention.

Example 1 is as follows. Referring to FIG. 6, assume that A and B are the fastest and slowest links in the switching system, respectively. It is assumed that a delay difference of A and B is N-1, that is, when a cell received by link B is written to address 1, a cell received by link A needs to be written to address N, and meanwhile all cells in address 0 are currently switched. Then, in the next switching period, a cell received by link A may be written in the buffering unit of address 0, meanwhile all cells in address 1 are currently switched, and a cell received by link B is written to address 2.

Example 2 is as follows.

Assume that the SW receives cells 101, 102, 103 . . . 110 in each switching period of 10S.

It is assumed that a total of four links a, b, c, and d exist, jitter delay values of the four links are all 1S, and link delay values are respectively 2S, 4S, 6S, and 8S. Then, the link delay differences are respectively 6S, 4S, 2S, and 0S.

The buffering unit of each link requires a total of 6+1+2, namely, 9 units, which are marked as units 1, 2, 3, 4, 5, 6, 7, 8, and 0.

It is assumed that the buffered cell in the first out-buffer sequence is 103 and is stored in unit 2.

Link a is the fastest link, previously received cells 103, 104, . . . 110 have been stored in its buffering units 2, 3, . . . 8, 0, the cell received at the current time is 101, its corresponding buffering unit is calculated as 2+6+1+1=10 which is divided by 9 to obtain a remainder of 1, and then cell 101 is written in the buffering unit 1.

The delay value of link b is 4S, 2S smaller than that of link a, cell 109 in the last period is received at the current time, its corresponding buffering unit is calculated as 2+4+1+1=8, cell 109 is written in the buffering unit 8, previously received cells 103, 104, . . . 108 are stored in the buffering units 2, 3, . . . 7, respectively, and the buffering units 0 and 1 are empty.

The delay value of link c is 2S, 4S smaller than that of link a, cell 107 in the last switching period is received at the current time, its corresponding buffering unit is calculated as 2+2+1+1=6, cell 107 is written in the buffering unit 6, previously received cells 103, 104, . . . 106 in the last switching period are respectively stored in the buffering units 2, 3, . . . 5, respectively, and the buffering units 7, 8, 0, 1 are empty.

The delay value of link d is 0S, 6S smaller than that of link a, cell 105 in the last switching period is received at the current time, its corresponding buffering unit is calculated as 2+0+1+1=4, cell 105 is written in the buffering unit 4, previously received cells 103, 104 in the last switching period are respectively stored in the buffering units 2, 3, respectively, and the buffering units 5-8, 0, 1 are all empty.

Cell 103 in the buffering unit 2 is switched at the current time, and the buffering unit 2 after switching is empty.

Accordingly, link a can write the received cell 102 in the buffering unit 2 at the next time.

Figure 7:
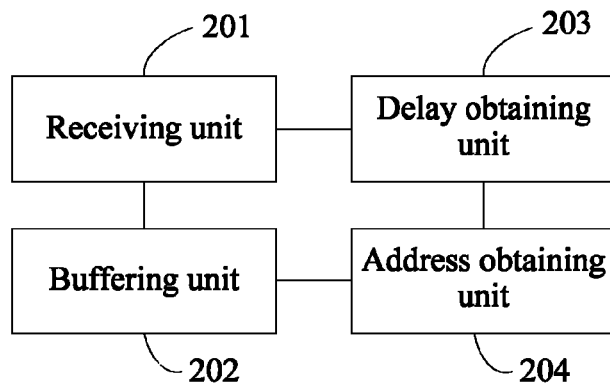
FIG. 7 is a schematic structural diagram of a device for buffering a cell by a crossbar switching matrix in an embodiment of the present invention.

Referring to FIG. 7, an embodiment of the present invention further provides a device for buffering a cell by a crossbar switching matrix, which includes:

a receiving unit 201, configured to receive a cell to be switched;

a buffering unit 202, configured to buffer the cell to be switched;

a delay obtaining unit 203, configured to obtain a jitter delay value of the cell according to a timestamp carried in the cell to be switched, in which the timestamp is used for indicating a jitter delay of the cell to be switched in link transmission, obtain, according to a preset mapping between link delay values and links, a link delay value corresponding to a link transmitting the cell to be switched, and obtain an out-buffer time difference between the cell to be switched and a buffered cell in a first out-buffer sequence according to the jitter delay value and the link delay value; and an address obtaining unit 204, configured to obtain a buffer address of the buffered cell in the first out-buffer sequence in the buffering unit, and obtain a buffer address of the cell to be switched in the buffering unit according to the out-buffer time difference and the buffer address of the buffered cell in the first out-buffer sequence.

Further, the link delay value may specifically be a link delay difference, the link delay difference indicates a difference of a link delay value of a link relative to a link delay value of a designated link, and a link with a maximum link delay value is used as the designated link.

Still further, the buffering unit includes X+Y+2 units, where X is a maximum jitter delay value of all links, and Y is a maximum link delay difference of all the links.

Still further, the delay obtaining unit 203 is specifically configured to use a value obtained by adding 1 to a sum of a jitter delay value and the link delay difference of the link transmitting the cell to be switched as the out-buffer time difference;

it is assumed that the out-buffer time difference is I, and the buffered cell in the first out-buffer sequence is stored in a $J^{th}$ unit of the buffering unit, where J is not greater than X+Y+2; and the address obtaining unit 204 is specifically configured to, when I+J is not greater than X+Y+2, use a buffer address of the $(I+J)^{th}$ unit in the buffering unit as the buffer address of the cell to be switched, and when I+J is greater than X+Y+2, use a buffer address of a $K^{th}$ unit in the buffering unit as the buffer address of the cell to be switched, where K is a remainder of (I+J) divided by (X+Y+2).

In the device provided in the embodiment of the present invention, the size of the cell buffer is related to only the link delay value and the jitter delay value, and is unrelated to the value of G2S, and the sum of the link delay value and the jitter delay value is smaller than the value of G2S, so the size of the cell buffer can be reduced as compared with the prior art.

The method and the device for buffering a cell by a crossbar switching matrix provided in the embodiments of the present invention are described in detail above. The principle and implementation of the present invention are described herein with specific examples. The above description of the embodiments is merely provided for ease of understanding the method and core ideas of the present invention, and shall not be construed as limitations to the present invention.

What is claimed is:

1. A method for buffering a cell by a crossbar switching matrix, comprising:
    receiving a cell to be switched, and obtaining a jitter delay value of the cell according to a timestamp carried in the cell to be switched, wherein the timestamp is used for indicating a jitter delay of the cell to be switched in link transmission;
    obtaining, according to a preset mapping between a link delay value and a link, wherein the link delay value corresponds to a link transmitting the cell to be switched;
    obtaining a buffer address of a buffered cell in a first out-buffer sequence in a buffering unit;
    obtaining an out-buffer time difference between the cell to be switched and the buffered cell in the first out-buffer sequence according to the jitter delay value and the link delay value; and
    obtaining a buffer address of the cell to be switched in the buffering unit according to the out-buffer time difference and the buffer address of the buffered cell in the first out-buffer sequence.

2. The method according to claim 1, wherein:
    the link delay value is specifically a link delay difference, the link delay difference indicates a difference of a link delay value of a link relative to a link delay value of a designated link, and a link with a maximum link delay value is used as the designated link.

3. The method according to claim 2, wherein:
    the buffering unit comprises X+Y+2 units, where X is a maximum jitter delay value of all links, and Y is a maximum link delay difference of all the links.

4. The method according to claim 3, wherein:
    the obtaining the out-buffer time difference between the cell to be switched and the buffered cell in the first out-buffer sequence according to the jitter delay value and the link delay value, and the obtaining the buffer address of the cell to be switched in the buffering unit according to the out-buffer time difference and the buffer address of the buffered cell in the first out-buffer sequence comprise:
    using a value obtained by adding 1 to a sum of the jitter delay value and the link delay difference of the link transmitting the cell to be switched as the out-buffer time difference; and
    wherein the out-buffer time difference is I, and the buffered cell in the first out-buffer sequence is stored in a Jth unit of the buffering unit, where J is not greater than X+Y+2, when I+J is not greater than X+Y+2, using a buffer address of the (I+J)th unit in the buffering unit as the buffer address of the cell to be switched, and when I+J is greater than X+Y+2, using a buffer address of a Kth unit in the buffering unit as the buffer address of the cell to be switched, where K is a remainder of (I+J) divided by (X+Y+2).

5. A device for buffering a cell by a crossbar switching matrix, comprising:
    a receiving unit, configured to receive the cell to be switched;
    a buffering unit, configured to buffer the cell to be switched;
    a delay obtaining unit, configured to obtain a jitter delay value of the cell according to a timestamp carried in the cell to be switched, wherein the timestamp is used for indicating a jitter delay of the cell to be switched in link transmission, obtain, according to a preset mapping between a link delay value and link, wherein the link delay value corresponds to a link transmitting the cell to be switched, and obtain an out-buffer time difference between the cell to be switched and a buffered cell in a first out-buffer sequence according to the jitter delay value and the link delay value; and an address obtaining unit, configured to obtain a buffer address of the buffered cell in the first out-buffer sequence in the buffering unit, and obtain a buffer address of the cell to be switched in the buffering unit according to the out-buffer time difference and the buffer address of the buffered cell in the first out-buffer sequence.

6. The device according to claim 5, wherein:
the link delay value is specifically a link delay difference, the link delay difference indicates a difference of a link delay value of a link relative to a link delay value of a designated link, and a link with a maximum link delay value is used as the designated link.

7. The device according to claim 6, wherein:
the buffering unit comprises $X+Y+2$ units, where X is a maximum jitter delay value of all links, and Y is a maximum link delay difference of all the links.

8. The device according to claim 7, wherein:
the delay obtaining unit is specifically configured to use a value obtained by adding 1 to a sum of the jitter delay value and the link delay difference of the link transmitting the cell to be switched as the out-buffer time difference;

wherein the out-buffer time difference is I, and the buffered cell in the first out-buffer sequence is stored in a Jth unit of the buffering unit, where J is not greater than $X+Y+2$; and the address obtaining unit is specifically configured to, when $I+J$ is not greater than $X+Y+2$, use a buffer address of the $(I+J)$th unit in the buffering unit as the buffer address of the cell to be switched, and when $I+J$ is greater than $X+Y+2$, use a buffer address of a Kth unit in the buffering unit as the buffer address of the cell to be switched, where K is a remainder of $(I+J)$ divided by $(X+Y+2)$.

* * * * *